US006699569B2

(12) United States Patent
Lipper

(10) Patent No.: US 6,699,569 B2
(45) Date of Patent: *Mar. 2, 2004

(54) PROMOTIONAL CARD WITH INTEGRAL REMOVABLE GEMSTONE TATTOO

(76) Inventor: Chris Lipper, 35 Buckley Hill Rd., Morristownship, NJ (US) 07960

( * ) Notice: Subject to any disclaimer, the term of this patent is extended or adjusted under 35 U.S.C. 154(b) by 0 days.

This patent is subject to a terminal disclaimer.

(21) Appl. No.: 09/861,474

(22) Filed: May 18, 2001

(65) Prior Publication Data

US 2002/0011014 A1 Jan. 31, 2002

Related U.S. Application Data

(63) Continuation-in-part of application No. 09/110,551, filed on Jul. 6, 1998, now Pat. No. 6,231,952, which is a continuation-in-part of application No. 08/914,128, filed on Jul. 19, 1997, now Pat. No. 5,776,586.

(51) Int. Cl.$^{7}$ ........................ B32B 27/14; B32B 33/00; B41M 3/12; B05D 1/36; B41J 2/01

(52) U.S. Cl. ...................... 428/195; 428/42.1; 428/914; 428/913.3; 427/152; 427/201; 347/105

(58) Field of Search ................................ 428/195, 42.1, 428/914, 913.3, 40.1; 427/152, 201; 347/105

(56) References Cited

U.S. PATENT DOCUMENTS 4,415,623 A * 11/1983 Schlaepfer .................. 156/230
5,776,586 A * 7/1998 Lipper ........................ 428/192
6,231,952 B1 * 5/2001 Lipper ........................ 428/192

* cited by examiner

*Primary Examiner*—Elizabeth Mulvaney
*Assistant Examiner*—L. Ferguson
(74) *Attorney, Agent, or Firm*—Law Offices of Royal W. Craig

(57) ABSTRACT

Trading cards for clothing and the like that include an integral removable gemstone applique (tattoo), or an integral removable temporary printed tattoo with gemstone adornments, both for body ornamentation purposes. The gemstone tattoo is formed on a multi-layer-paper backing that is attached to the trading card by special pressure sensitive adhesive. The tattoo also includes a water soluble slip layer, a waterproof film coating, and a plurality of gemstones bonded to the waterproof film and sandwiched between the film and slip layer. The gemstone trading card is a stimulating and eye-catching novelty that compels notice by potential customers.

6 Claims, 3 Drawing Sheets

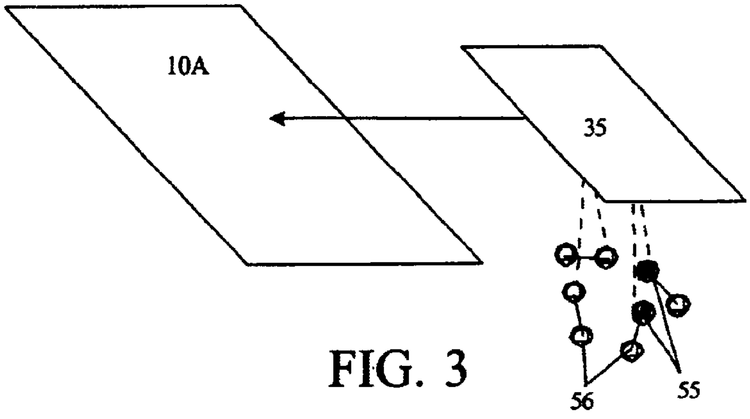

FIG. 3

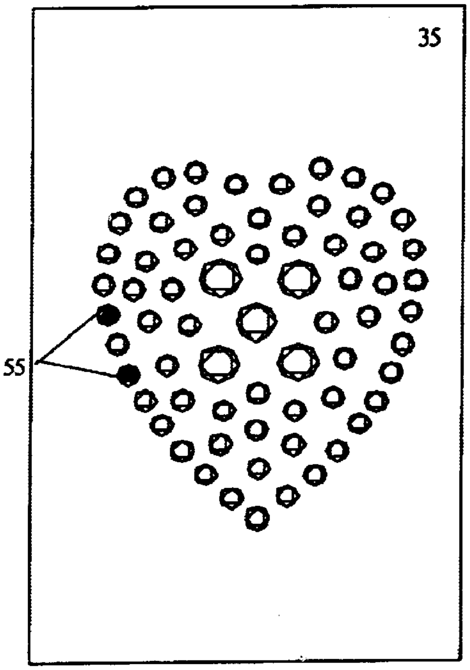

FIG. 4

Application 32

1. Clean and dry skin completely of all oils and lotions.
2. Peel off paper backing leaving all stones on the clear plastic sheet. If all stones do not adhere to top sheet, press down and try again.
3. Press clear plastic sheet, sticky side down, at location desired. Your Whozy Woozy™ should last for several days if applied correctly. If your skin is not totally clean of oils and lotions you may have difficulty applying all the stones to your skin. If this occurs please try spraying hair spray to the back of the stones apply firmly to skin and let sit on the skin for one minute. This should fix this problem.
4. Press firmly on all stones, then peel off clear plastic sheet. Your Whozy Woozy™ should last several days if applied correctly. NEVER place Whozy Woozy™ Tattoos near eyes.

Removal: To remove Whozy Woozy™ Tattoos, please remove one stone at a time.

Caution: Discontinue use if irritation appears.

For further information contact Chris Co., Inc. at 973 285 399 or go to www.whozywoozy.com

FIG. 5

PROMOTIONAL CARD WITH INTEGRAL REMOVABLE GEMSTONE TATTOO

CROSS-REFERENCE TO RELATED APPLICATIONS

The present application is a continuation-in-part of U.S. patent application Ser. No. 09/110,551, now U.S. Pat. No. 6,231,952 for "IDENTIFICATION CARD WITH INTEGRAL REMOVABLE TATTOO"; filed: Jul. 6, 1998, which is a continuation-in-part of U.S. Ser. No. 08/914,128, filed Jul. 19, 1997, now U.S. Pat. No. 5,776,586.

BACKGROUND OF THE INVENTION

1. Field of the Invention

The present invention relates to temporary tattoos and, more particularly, to trading cards that carry an integral removable gemstone applique (tattoo), or an integral removable temporary printed tattoo with gemstone adornments, both for decorative and promotional purposes.

2. Description of the Background

Merchandising is a very important aspect of the retailing business. Merchandising includes various product handling considerations, including a timely and effective distribution system, establishing an effective product mix, product packaging, department set-up, and advertising considerations, etc. Trading Card promotional programs maximize consumer awareness and drive sales for a variety of products. However, marketing through trading cards is becoming a competitive field, and each new generation of trading card requires more colorful attention-grabbing designs, graphics and labels. Moreover, the physical aspects of the trading cards have evolved. For instance, there are now gold and silver foil cards, holographic cards, etc. All of these "standout" cards quickly become the center of collector efforts, and as a result there is a significant commercial need for further variations or modifications to the basic trading card design.

There now exists a process for making improved decals by securing an extremely thin, flexible and extensible design closely simulating an actual tattoo. Specifically, U.S. Pat. No. 4,522,864 issued Jun. 11, 1985 to Humason et al. discloses "Decals and Process for Making Same". The disclosed decals include a multi-layer-paper backing, water soluble slip layer, waterproof film coating, lithograph offset printed design, and transparent pressure sensitive adhesive. Decals of this type appear very bright, exciting and eye-catching.

In U.S. Pat. No. 5,776,586, the inventor herein adapted the above-described decal-making process for making hang-tags with integral removable tattoos.

It would be greatly advantageous to further adapt the above-described decal-making process for manufacturing a new breed of "standout" trading cards having integral removable gemstone appliques (gemstone tattoos) which adhere small gemstones to the skin, thereby giving the effect of jewelry tattoos. It would also be advantageous to provide an integral removable temporary printed tattoo with gemstone adornments. In either case, the gemstone tattoos can be combined in an economical way so as to make the trading card more compelling, and the gemstone tattoo trading cards can be offered as a "G.W.P." (i.e., gift with purchase). Given a choice between a traditional trading card versus one with an integral removable gemstone tattoo, a consumer will more often choose the latter. This is especially true with licensed products, e.g., a Calvin Klein licensee selling sweatshirts with CK logos would increase market share by distributing gemstone tattoo trading cards with CK designs.

Accordingly, a need exists for an economical, convenient means of enhancing a conventional temporary tattoo with gemstones so that it becomes exciting and eye-catching, and then enhancing a conventional trading card with the gemstone temporary tattoo to compel notice by potential customers and to increase sales.

Likewise, a need exists for an integral removable gemstone applique (gemstone tattoo) by which gemstones alone can be applied to the skin in a pre-determined array thereby giving the effect of jewelry tattoos.

Of course, any enhancement or supplement to an existing trading card must leave sufficient space for advertising, consumer product information, and pricing information, and it must not significantly raise the cost.

SUMMARY OF THE INVENTION

In accordance with the above, it is an object of the present invention to provide a simple, inexpensive and convenient enhancement to a conventional trading card so that it becomes more stimulating and eye-catching, thereby compelling notice by potential customers.

It is another object to provide both an integral removable gemstone applique (tattoo) that adheres gemstones to the skin of a user.

It is another object to provide an integral removable temporary printed tattoo with gemstone adornments, which adheres a temporary print-design tattoo with gemstone glitter accents to the skin of a user.

It is another object to provide a trading card with a lasting impact.

According to the present invention, the above-described and other objects are accomplished by providing a promotional trading card with an integral removable gemstone applique (tattoo), or an integral removable temporary printed tattoo with gemstone adornments, in both cases for decorative and promotional purposes.

The trading card includes a cardboard sheet having a front surface bearing pre-printed subject matter such as manufacturer advertising and/or other information. The cardboard sheet may take the form of a trading card, greeting card (folded), hang-tag (perforated for insertion of a swift tack), or other display medium for print.

In a first embodiment, a temporary gemstone tattoo is removably attached to the front of the cardboard sheet. Though the tattoo may conceivably be constructed in other ways, the presently preferred tattoo includes a plurality of gemstones having a thin layer of silver foil adhered to their base to provide a flat non-porous backing for adhesion to the skin of a user. The front of each gemstone is then coated with a temporary non-toxic bonding agent. The gemstones are then adhered by their front sides to a transparent display sheet, and a second application of temporary non-toxic bonding agent is applied to the backside of the silver foil on each gemstone.

The combined display sheet with adhered gemstones is press-fit in place on the cardstock with sandwiched gemstones and the bonding agent thereon securing the display sheet to the cardstock. The temporary gemstone tattoo is removably attached to the cardboard sheet via the layer or line of pressure sensitive adhesive. The trading card is intended for conveying promotional information regarding characters, and the removable gemstone tattoo array may be removed and applied to the skin, thereby generating further publicity.

Another embodiment is disclosed which combines gemstones with a conventional temporary printed tattoo as accents/glitter. The printed gemstone tattoo allows the attachment of a printed temporary tattoo design accentuated by a plurality of gemstones to create a unique three-dimensional tattoo appearance. The layers of the printed temporary gemstone tattoo include a base piece of water soluble slip layer which is bonded to a piece of decal paper. A transparent thin-vinyl film with printed tattoo design is then adhered to the slip layer. A plurality of gemstones are attached directly to the transparent film opposite the print to complement the printed tattoo design. Alternatively, a second transparent thin-vinyl film may be adhered to the printed film, and the plurality of gemstones may be attached to the second transparent film, thereby protecting the printed film. As before, the removable printed tattoo with array of gemstone accents may be removed and applied to the skin, thereby generating further publicity

BRIEF DESCRIPTION OF THE DRAWINGS

Other objects, features, and advantages of the present invention will become more apparent from the following detailed description of preferred embodiments and certain modifications thereof when taken together with the accompanying drawings in which:

FIG. 3 is a break-away perspective drawing showing the temporary gemstone tattoo 30 removed from the various layers of trading card 2.

FIG. 4 is a front perspective drawing of the temporary gemstone tattoo 30.

FIG. 5 is a rear perspective drawing of the temporary gemstone tattoo 30.

DETAILED DESCRIPTION OF THE PREFERRED EMBODIMENTS

Figure 1:
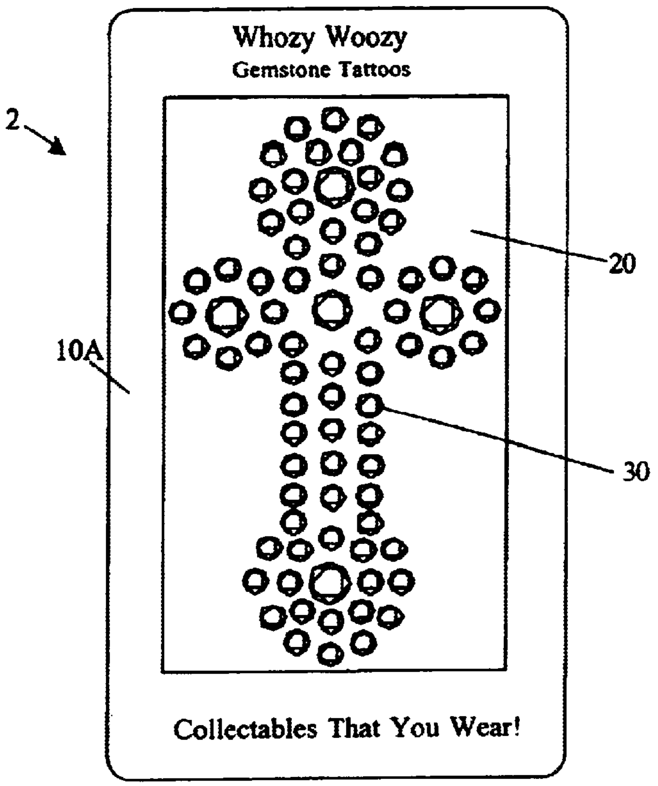
FIG. 1 is a front perspective view of an exemplary trading card 2 with integral temporary gemstone tattoo 30 according to one embodiment of the present invention.

FIG. 1 is a front perspective view of an exemplary trading card 2 with integral temporary gemstone tattoo 30 according to one embodiment of the present invention.

The trading card 2 of the present invention is formed of a laminated cardstock and may be flat or folded, if desired, in the manner of a greeting card. The front panel 10A is preferably printed and/or embossed to convey promotional information, character information, and other information as desired. A central area 20 is left blank for application of the removable gemstone tattoo 20. If desired, the trading card 2 may be perforated with a hole through the upper margin to allow the card 2 to be hung by from a product by a "swifttack" (i.e., a looped plastic fastener applied by a gun), or a string, cord or thread inserted through the top of the card.

Figure 2:
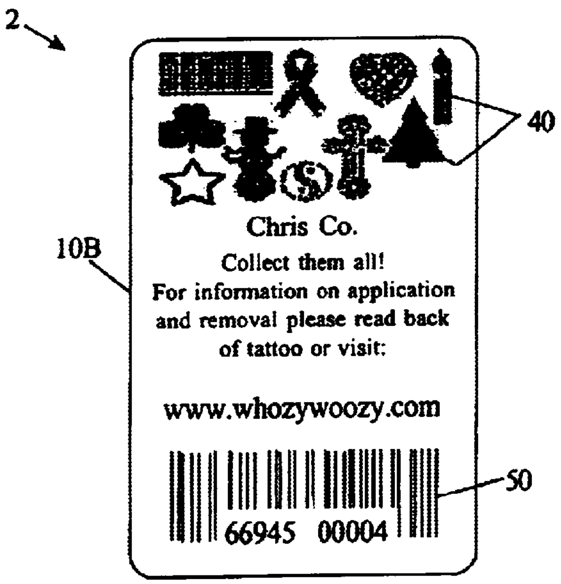
FIG. 2 is a rear perspective view of the trading card 2 of FIG. 1.

FIG. 2 is a rear perspective view of the backside 10B of trading card 2 of FIG. 1. Backside 10B is defined by other printed indicia which may include manufacturer sales information, a menu of other designs 30, a bar code 40, etc., as desired.

FIG. 3 is a break-away perspective drawing showing the temporary gemstone tattoo 30 removed from the cardstock sheet 10. The tattoo 30 is of simple and inexpensive design and allows the attachment of a plurality of gemstones 55 arranged in a variety of designs to a flat surface such as skin in order to simulate body jewelry. The gemstones 55 may be any small cut glass or plastic gemstones. A thin layer of silver foil 56 is adhered to the base of each gemstone 55 to provide a flat non-porous backing for proper adhesion to the skin of a user. The front of each gemstone 55 is then coated with a conventional temporary non-toxic bonding agent. The gemstones 55 are then adhered by their front sides to a transparent display sheet 35 which may be conventional cellophane. A second application of temporary non-toxic bonding agent is then applied to the backside of the silver foil 56 on each gemstone 55. The combined display sheet 35 with adhered gemstones 55 is then press-fit in place within the window 20 on cardstock 10B with sandwiched gemstones 55 and the bonding agent thereon securing the display sheet 35 to the cardstock 10B. The assembly is then preferably wrapped for protection in a conventional trading card package (not shown).

FIG. 4 is a front perspective drawing of the temporary gemstone tattoo 30 illustrating a heart design for the plurality of gemstones 36.

FIG. 5 is a rear perspective drawing of the temporary gemstone tattoo 30. A multi-color offset lithograph can be imprinted on the underside of decal paper 32 as shown in FIG. 5 to convey tattoo application instructions or the like. The decal paper 32 and film 38 seal the gemstones 55 inside and provide a moisture-proof protective envelope for the gemstones 55 until they are actually applied (e.g., to the skin of the user).

The gemstone tattoo 30 incorporated in the present invention as shown in FIGS. 3 and 4 lends itself to application to any flat surface including skin, and it closely simulates actual body jewelry. To apply the finished gemstone tattoo 30, the combined display sheet 35 with adhered gemstones 55 is carefully detached from the cardstock 10. This is accomplished in accordance with instructions printed on the cardstock 10 by gripping the upper left margin of the cardstock 10 between thumb and forefinger and bending back slightly, and by then peeling the display sheet 35 with adhered gemstones 55 from the cardstock. This must be done gently to ensure that the gemstones 55 remain adhered to the display sheet 35. The display sheet 35 is then pressed against the skin, gemstones 55 down, until the bonding agent resident on the thin layer of silver foil 56 grips the skin to retain the gemstones 55 thereon. The gemstones 55 should remain bonded to the skin for several days if applied correctly.

Figure 6:
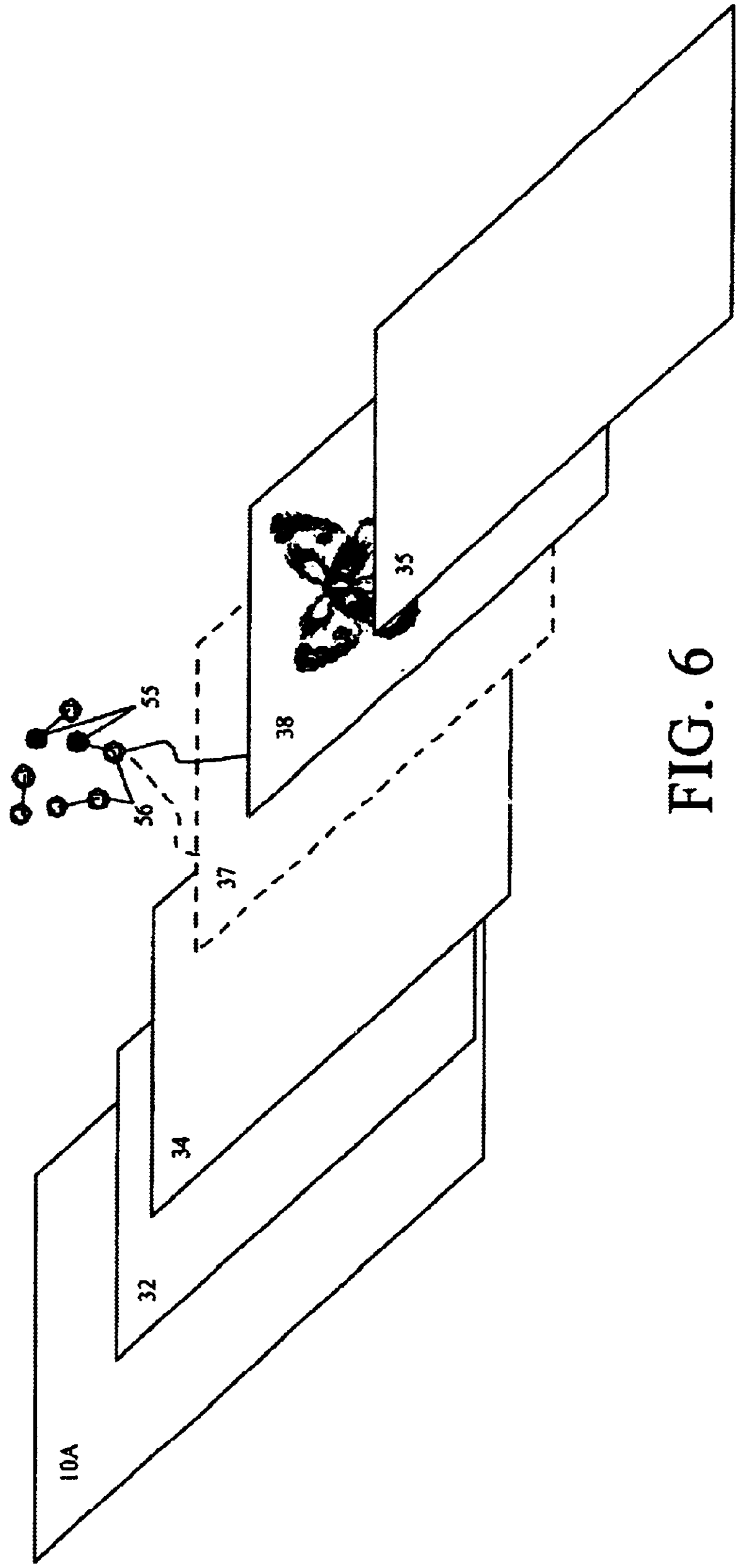
FIG. 6 is a break-away perspective drawing of another embodiment of the present invention in which gemstones 55 are combined with a conventional temporary tattoo as accents/glitter.

FIG. 6 is a break-away perspective drawing of another embodiment of the present invention in which gemstones 55 are combined with a conventional temporary tattoo as accents/glitter. Again, the tattoo is of simple and inexpensive design and allows the attachment of a printed temporary tattoo design accentuated by a plurality of gemstones to create a unique three-dimensional tattoo appearance. The layers of the embodiment of FIG. 6 include a base piece of water soluble slip layer 34 which is bonded to a piece of decal paper 32. Slip layer 34 is formed by spraying or otherwise applying a coating comprising a solution of water soluble material to the base sheet of decal paper 32, and then drying slip layer 34. A transparent thin-vinyl film 38 with tattoo design is then adhered to the slip layer 34. The tattoo design may be lithographically printed on the outwardly facing surface of transparent film 38 with non-toxic ink as in conventional temporary tattoo fabrication methods. A plurality of gemstones 55 are attached directly to the transparent film 38 opposite the print to complement the printed tattoo design. In this case, by applying the gemstones 55 directly to the transparent film 38 there is a risk that the adhesive on the gemstones 55 can affect the tattoo design. For this reason it is best to leave blank marks when lithographically printing the tattoo design on the outwardly facing surface of transparent film 38 to avoid any effect. Alternatively, a second transparent thin-vinyl film 37 (dotted lines) may be adhered to the printed film 38, and the plurality of gemstones 55 may be attached to the second transparent film 37 (as indicated by dotted lead line). This serves to protect the printed film 38.

In either case, gemstones 55 are again any small cut glass or plastic gemstones with a thin layer of silver foil 56 adhered to the base of each gemstone 55 to provide a flat non-porous backing. A removable bonding agent is applied to the foil backing of each gemstone for proper adhesion to the transparent film 38. The front of each gemstone 55 is also coated with bonding agent. Pressure sensitive skin-adhesive is applied overtop transparent film 38. A preferred adhesive is an aqueous emulsion of vinyl-acrylic copolymer, and a variety of suitable adhesives are commercially available. It is important that the pressure-sensitive adhesive be uniform, and it has been found that an adhesive having superior characteristics in the present relation is secured by application of the emulsion by a silk screen procedure. A transparent display sheet 35 (which may be conventional cellophane) is layered over top transparent film 38 and remains bonded thereto. The assemblage of layers 32–56 is preferably bonded to the front side 10A of the cardstock using a reattachable bonding agent such as that which is commercially available from 3M Corporation®. Other forms of attachment may be employed if desired, such as tape, paper clips, staples, etc. The entire assembly is then preferably packaged in a conventional trading card wrapper for protection.

To apply the finished tattoo, the assemblage of layers 32–56 is removed from the front side 10A of the cardstock, and the transparent layer 35 is removed. The remaining assemblage is pressed to the skin of the user (decal paper 32 up), and water is applied to the decal paper 32 to wet it and to soften or dissolve the slip layer 34. The decal paper 32 and any residue is removed, leaving the gemstones 55 atop printed film 38 in place. The gemstones 55 and tattoo design on film 38 should remain bonded to the skin for several days if applied correctly.

The embodiment of FIG. 6 provides a convenient means of enhancing a conventional temporary tattoo with gemstones so that it becomes exciting and eye-catching, and compels notice by potential customers and to increase sales.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

I claim:

1. A trading card with integral removable gemstone tattoo, comprising:

a laminated cardstock sheet having at least one surface bearing pre-printed subject matter, a removable gemstone tattoo displaying a plurality of gemstones in an arranged design form, said gemstone tattoo further comprising, a panel of porous decal paper, a reattachable bonding agent for removably attaching said panel of porous decal paper to said cardboard sheet;

a water soluble slip layer carried on said porous decal paper, a water resistant film carried on said water soluble slip layer, a plurality of gemstones sandwiched between said water soluble slip layer and water resistant film and bonded to the water resistant film in an arranged design form;

a skin bonding agent covering the water resistant film for removably attaching said plurality of gemstones to the skin of a user.

2. A tattoo trading card with integral removable tattoo, comprising:

a laminated cardstock sheet having at least one surface bearing pre-printed subject matter, a removable tattoo comprising, a panel of porous decal paper, a reattachable bonding agent for removably attaching said panel of porous decal paper to said cardboard sheet;

a water soluble slip layer carried on said porous decal paper, a water resistant film carried on one side by said water soluble slip layer, a printed tattoo design on an opposing side of said water resistant film;

a skin bonding agent covering the opposing side of said water resistant film for removably attaching said film to the skin of a user.

3. The greeting card with integral removable gemstone tattoo according to claim 1, wherein said laminated cardstock sheet is folded, and a print design is printed on one side of said water resistant film layer.

4. The greeting card with integral removable gemstone according to claim 3, wherein said at least one layer of water resistant film further comprise two layers of water resistant film carried on said water soluble slip layer, said print design being printed on one layer of said water resistant film, and said plurality of gemstones being bonded to another layer of said water resistant film.

5. A temporary gemstone tattoo, comprising:

a laminated cardstock sheet having at least one surface bearing pre-printed subject matter;

a water resistant film; and a plurality of gemstones in an arranged design form and bonded to said water resistant film, said gemstones each having a reattachable bonding agent applied to both sides for removably bonding to both said laminated cardstock sheet and water resistant film;

whereby said plurality of gemstones may be removed by said water resistant film from said cardstock sheet while maintaining said arranged design form, and may be adhered to the skin of a user, whereupon said water resistant film may be removed to provide temporary body jewelry.

6. A tattoo greeting card with integral removable temporary tattoo, comprising:

a coated card stock sheet folded in the form of a greeting card; and a removable tattoo further comprising, a panel of porous decal paper, a water soluble slip layer carried on one side of said porous decal paper, a water resistant film carried on said water soluble slip layer, ornamental printed matter on said water resistant film, and a layer of pressure sensitive adhesive covering the printed matter; and a reattachable bonding agent applied to the other side of said porous decal paper along an edge thereof for removably attaching said edge of said removable tattoo to said coated card stock sheet;

whereby said removable tattoo may be removed from said coated card stock sheet and applied elsewhere.

* * * * *